US012227436B2

(12) United States Patent
Khdary et al.

(10) Patent No.: US 12,227,436 B2
(45) Date of Patent: Feb. 18, 2025

(54) METHOD FOR CLEANING UP OIL SPILLS USING MULTI-LAYERED CARBON FIBER-BASED ABSORBENTS

(71) Applicants: Mohammad Nezar H Khdary, Riyadh (SA); Nezar Hassan M. Khdary, Riyadh (SA)

(72) Inventors: Mohammad Nezar H Khdary, Riyadh (SA); Nezar Hassan M. Khdary, Riyadh (SA)

( * ) Notice: Subject to any disclaimer, the term of this patent is extended or adjusted under 35 U.S.C. 154(b) by 657 days.

(21) Appl. No.: 17/496,579

(22) Filed: Oct. 7, 2021

(65) Prior Publication Data
US 2023/0115751 A1   Apr. 13, 2023

(51) Int. Cl.
| | |
|---|---|
| C02F 1/28 | (2023.01) |
| B01D 17/02 | (2006.01) |
| B01J 20/20 | (2006.01) |
| B01J 20/28 | (2006.01) |
| B01J 20/30 | (2006.01) |

(Continued)

(52) U.S. Cl.
CPC ......... *C02F 1/288* (2013.01); *B01D 17/0202* (2013.01); *B01J 20/20* (2013.01); *B01J 20/28023* (2013.01); *B01J 20/3071* (2013.01); *B01J 20/3078* (2013.01); *B01J 20/3085* (2013.01); *C02F 1/40* (2013.01); *C09K 3/32* (2013.01); *E02B 15/045* (2013.01);

(Continued)

(58) Field of Classification Search
CPC .. C02F 1/288; C02F 1/40; C02F 1/283; C02F 2101/32; C02F 2303/16; B01D 17/0202; B01J 20/20; B01J 20/28023; B01J 20/3071; B01J 20/3078; B01J 20/3085; C09K 3/32; E02B 15/045; E02B 15/046; E02B 15/041; Y02A 20/204

USPC .......................................................... 210/671
See application file for complete search history.

(56) References Cited

U.S. PATENT DOCUMENTS

| | | | | |
|---|---|---|---|---|
| 9,010,030 | B2 * | 4/2015 | Davis ................. | E04D 13/076 52/12 |
| 2015/0027939 | A1 * | 1/2015 | Quinones ............ | B65G 17/44 210/170.01 |
| 2017/0036190 | A1 | 2/2017 | Pham | |

FOREIGN PATENT DOCUMENTS

| | | | | |
|---|---|---|---|---|
| CN | 205367801 U | * | 7/2016 | |
| CN | 107935324 A | * | 4/2018 | ............ C02F 9/00 |
| WO | WO2018009882 A1 | | 1/2018 | |

OTHER PUBLICATIONS

Translation of Zheng (CN107935324AZ) (Year: 2021).*
(Continued)

*Primary Examiner* — Ekandra S. Miller-Cruz

(57) ABSTRACT

A method for cleaning up oil spills using multi-layered carbon fiber-based absorbents is disclosed. The method for cleaning up oil spills requires an oil-contaminated area including a quantity of oil, a first storage vessel, an oil extraction machine, a heating element, and a multi-layered carbon fiber absorbent. The multi-layered modified carbon fiber absorbent is distributed to the oil-contaminated area, where the multi-layered modified carbon fiber absorbent is configured to extract the quantity of oil from the oil-contaminated area while maintaining hydrophobic. The quantity of oil is extracted and separated from the multi-layered modified carbon fiber absorbent using the oil extraction machine. The extracted quantity of oil is collected into the first storage vessel. The extract quantity of oil is then transferred over to a second storage vessel for later refinement.

13 Claims, 11 Drawing Sheets

(51) Int. Cl.
- *C02F 1/40* (2023.01)
- *C02F 101/32* (2006.01)
- *C09K 3/32* (2006.01)
- *E02B 15/04* (2006.01)

(52) U.S. Cl.
CPC ............ *E02B 15/046* (2013.01); *C02F 1/283* (2013.01); *C02F 2101/32* (2013.01); *C02F 2303/16* (2013.01)

(56) References Cited

OTHER PUBLICATIONS

Translation of Han (CN205367801U) (Year: 2016).*
Zheng, Y., Cao, E., Tu, L. et al., A comparative study for oil-absorbing performance of octadecyltrichlorosilane treated Calotropis gigantea fiber and kapok fiber., Cellulose 24, 989-1000, Feb. 2017.
Changcheng Xu, Yongqian Shen, Jian Li, Yan Zhang, Zhengfang Luo, Houde She, Robust superhydrophobic carbon fiber sponge used for efficient oil/corrosive solution mixtures separation, Vacuum, vol. 141, 2017, pp. 57-61.
Bin Wang, Rengasamy Karthikeyan, Xiao-Ying Lu, Jin Xuan, and Michael K. H. Leung, Hollow Carbon Fibers Derived from Natural Cotton as Effective Sorbents for Oil Spill Cleanup, Industrial & Engineering Chemistry Research, 18251-18261, Dec. 2013.
Karan, C & Rengasamy, R. & Das, Dipayan., Oil spill cleanup by structured fibre assembly., Indian Journal of Fibre and Textile Research. 36, 2011.

* cited by examiner

METHOD FOR CLEANING UP OIL SPILLS USING MULTI-LAYERED CARBON FIBER-BASED ABSORBENTS

FIELD OF THE INVENTION

The present invention generally relates to oil spill cleanup methods, specifically a method for cleaning up oil spills using multi-layered carbon fiber-based absorbents.

BACKGROUND OF THE INVENTION

Oil spills poses one of the biggest problems that lead to contaminated beaches, seas and oceans. Several methods have been used to get rid of pollutants, but all methods are time consuming and cost ineffective. Some methods are also not capable in salvaging the separated oil from water. Conventional methods that utilize chemicals and oleophilic extraction media to extract oil from oil spills disrupts and contaminates the extracted oil, rendering it unsalvageable waste.

The present invention provides a cost effective and time efficient process in cleaning up oil spills. The present invention reuses the oil after being separated from water by extracting it in a way that separates oil from water using multi-layered modified carbon fibers treated with an octadecyltrichlorosilane agent. The present invention is linked to an extraction system, where the extraction system consists of multiple storage vessels and an extraction machine. The multi-layered modified carbon fiber filter is distributed into the oil-contaminated waterways. The filter is oleophilic, absorbing the contaminated oil, while maintaining hydrophobic (not absorbing water). The modified carbon fiber filter is passed through the extraction machine, such that the oil is pressed out and extracted out of the modified carbon fiber filter. The separated oil is then collected by the storage vessels for further processing. The carbon fiber filter is then heated and dispensed back into the contaminated body of water through the extraction machine. The process is repeated until no oil is present in the body of water.

SUMMARY OF THE INVENTION

The present invention is a method for cleaning up oil spills using multi-layered carbon fiber-based absorbents. In order to execute the overall process for the method of the present invention, the present invention requires an oil-contaminated area comprising a quantity of oil, a first storage vessel, an oil extraction machine, a heating element, and a multi-layered carbon fiber absorbent. The multi-layered modified carbon fiber absorbent is distributed to the oil-contaminated area, where the multi-layered modified carbon fiber absorbent is configured to extract the quantity of oil from the oil-contaminated area while maintaining hydrophobic. The oil extraction machine may take the form of at least one motorized cylindrical roller extractor that passes and presses the multi-layered modified carbon fiber absorbent through the at least one motorized cylindrical roller extractor, where the quantity of oil is extracted and separated from the multi-layered modified carbon fiber absorbent. The extracted quantity of oil is collected into the first storage vessel. The extract quantity of oil is then transferred over to a second storage vessel for later refinement.

DETAILED DESCRIPTION OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

In reference to FIGS. 1-2 and 8-9, the present invention is a method for cleaning up oil spills using multi-layered carbon fiber-based absorbents. In order to execute the overall process for the method of the present invention, the present invention requires an oil-contaminated area comprising a quantity of oil, a first storage vessel, an oil extraction machine, a heating element, and a multi-layered carbon fiber absorbent. In the preferred embodiment of the present invention, the oil-contaminated area may take the form of a body of water such as, but not limited to oceans, gulfs, coastlines, estuaries or any other body of water. In the preferred embodiment of the present invention, the quantity of oil may take the form of petroleum-based pollutants from unintentional oil spills. In the preferred embodiment of the present invention, the oil extraction machine is installed along a watercraft. In another embodiment, the oil extraction machine is installed along a shoreline. In the preferred embodiment of the present invention, the multi-layered carbon fiber absorbent may take the form of an oleophilic absorbent material that is also hydrophobic.

Figure 1:
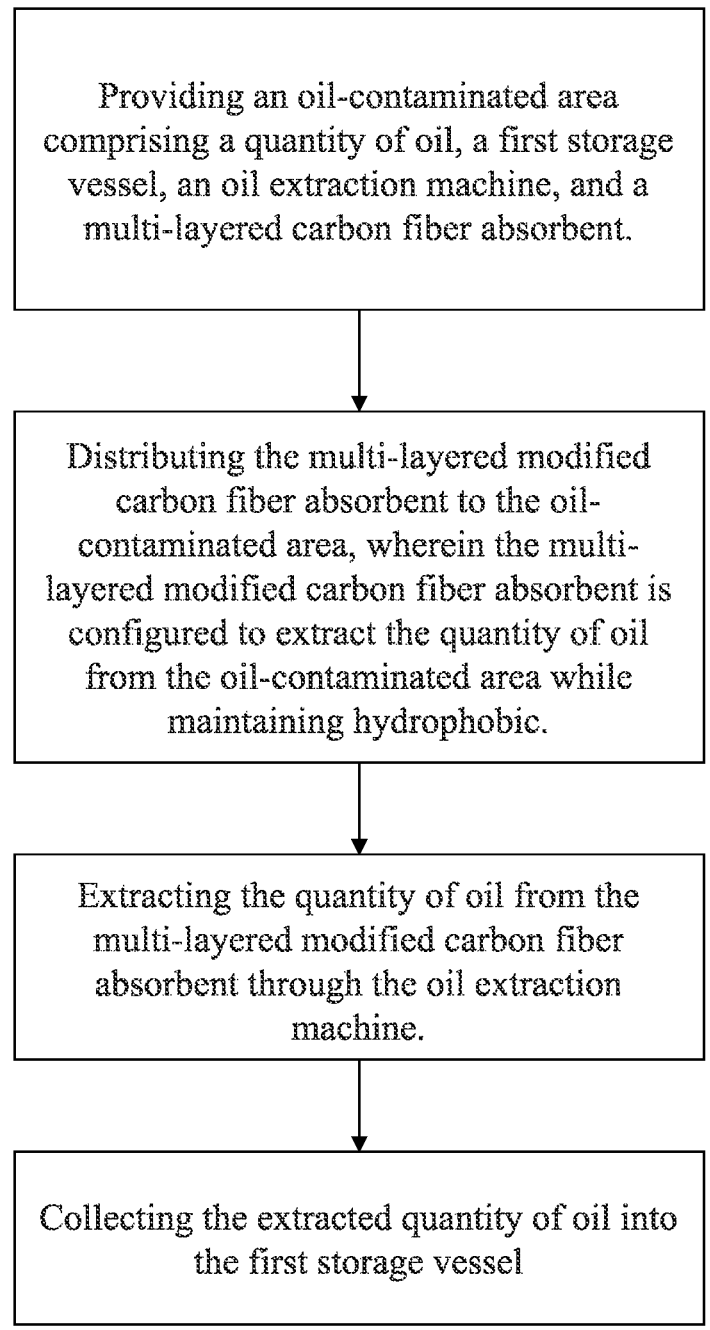
FIG. 1 is a flowchart illustrating the overall process for the present invention.
Figure 8:
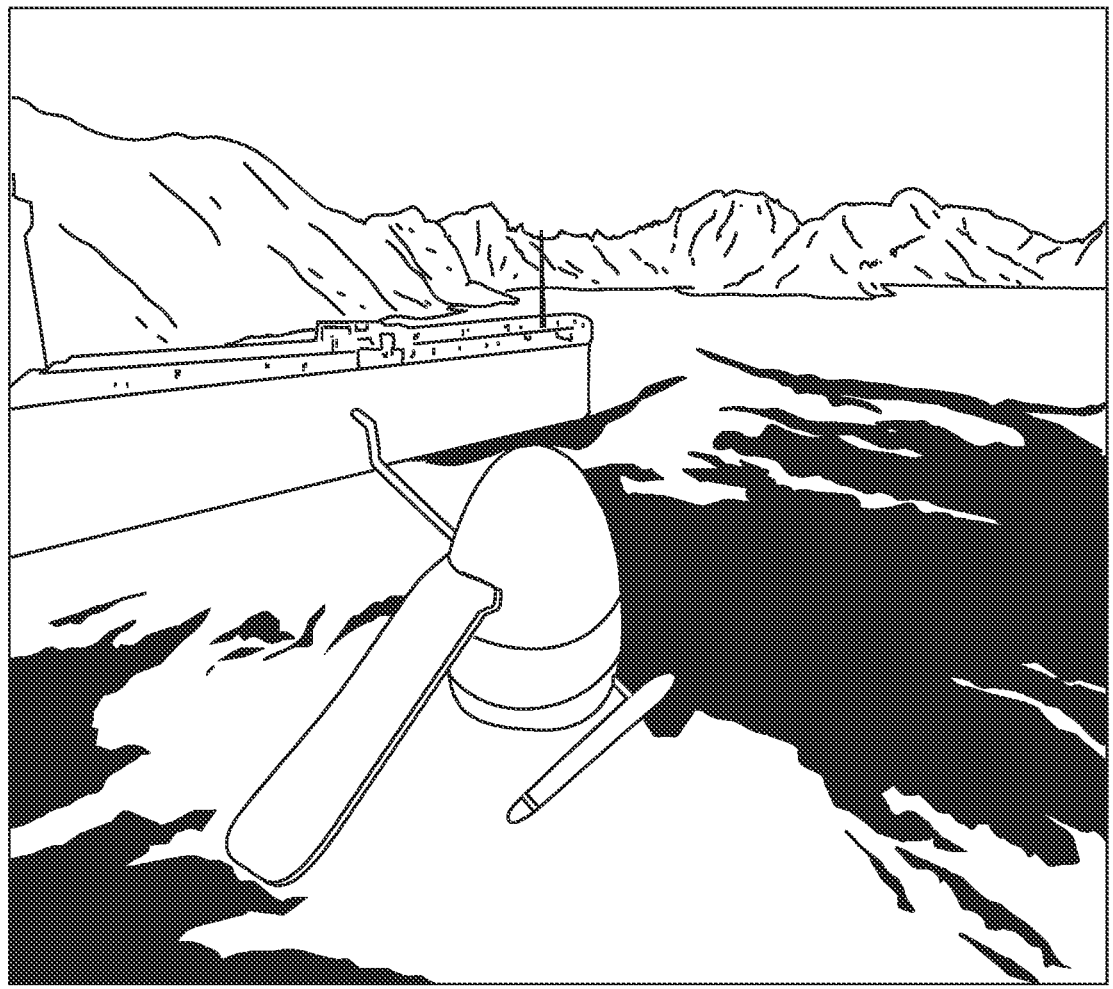
FIG. 8 is an illustration showing a first storage vessel and a second storage vessel floating along an oil-contaminated area.
Figure 9:
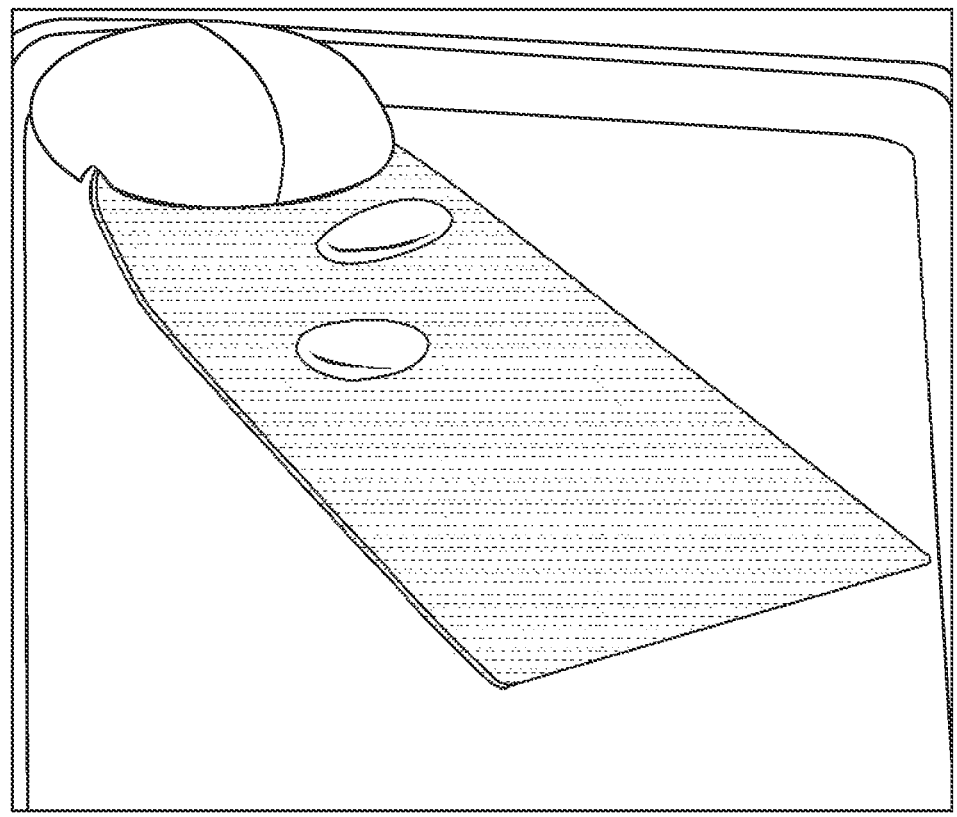
FIG. 9 is an illustration showing a first storage vessel floating along an oil-contaminated area.
Figure 10:
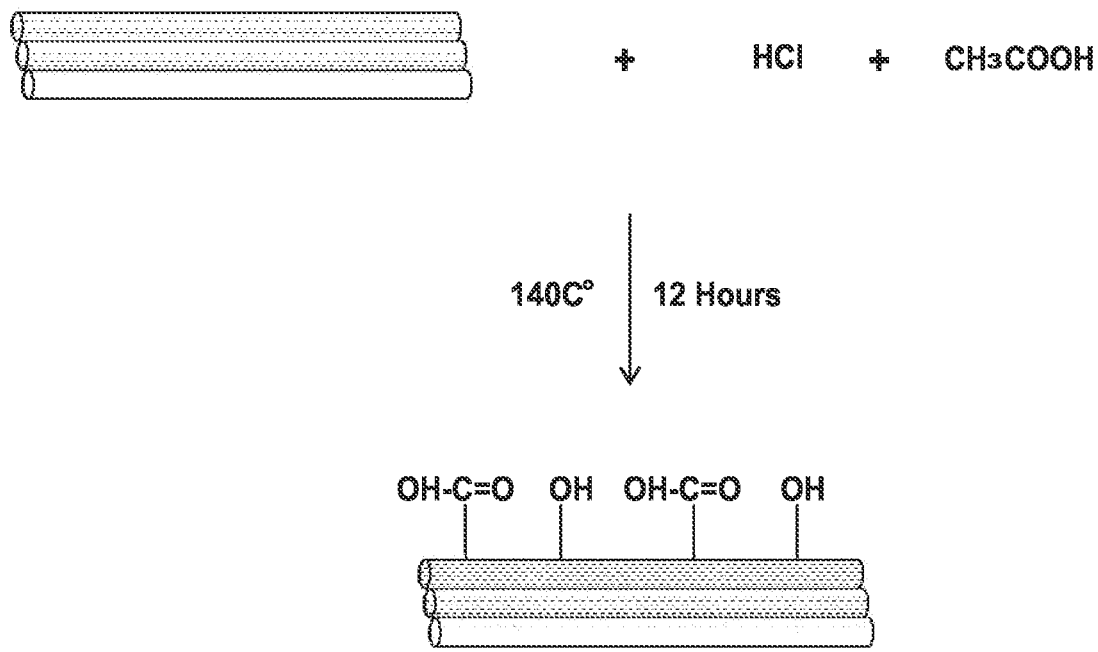
FIG. 10 is an illustration showing a functionalization reaction of the carbon fibers with carboxyl and hydroxyl groups carried out using acetic acid hydrochloric acid with heating and gentle agitation.
Figure 11:
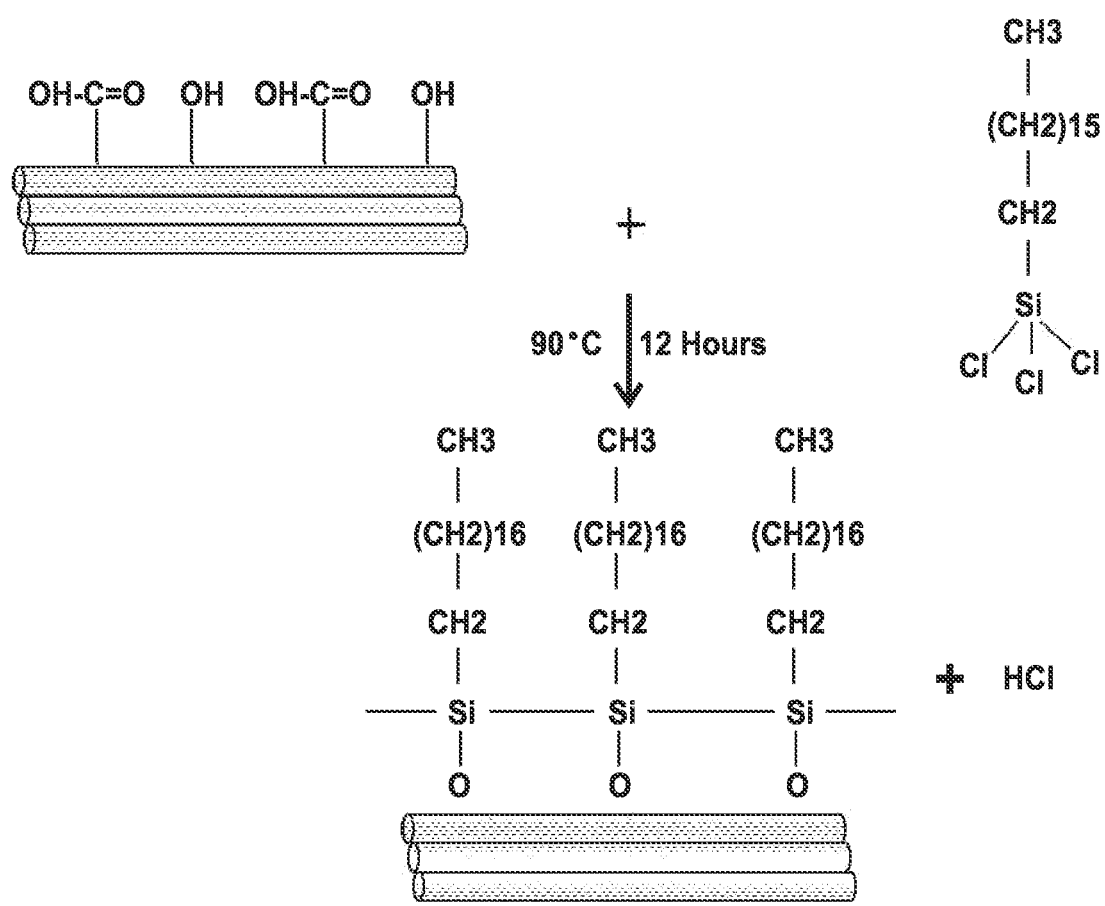
FIG. 11 is an illustration showing a reaction of the carbon fibers with octadecyltrichlorosilane agent.

In accordance with the preferred embodiment of the present invention, the multi-layered modified carbon fiber absorbent is distributed to the oil-contaminated area, where the multi-layered modified carbon fiber absorbent is configured to extract the quantity of oil from the oil-contaminated area while maintaining hydrophobic, as shown in FIGS. 1 and 8-9. In the preferred embodiment of the present invention, the multi-layered modified carbon fiber absorbent is distributed to the oil-contaminated area using the oil extraction machine, where the oil extraction machine comprises a filter conveyor, and where the filter conveyor dispenses the multi-layered modified carbon fiber absorbent to the oil-contaminated area. In another embodiment, the multi-layered modified carbon fiber absorbent may take the form of a strip that comprises a first end and a second end. The first end is fed into the conveyor inlet, where the multi-layered modified carbon fiber absorbent passes through the oil extraction machine, as shown in FIGS. 8-9. The second end is detected along the conveyor outlet using at least one sensory element, where the sensory element is electronically connected to the oil extraction machine, and where the at least one sensory element is configured to reverse the axis of rotation of the oil extraction machine, routing the second end back into the oil extraction machine from the conveyor outlet to the conveyor inlet. The first end is detected along the conveyor inlet using the at least one sensory element, where the at least one sensory element is configured to revert the axis of rotation of the oil extraction machine, routing the first end back into the oil extraction machine from the conveyor inlet to the conveyor outlet. This results the multi-layered modified carbon fiber absorbent strip to continuously oscillate along the oil-contaminated area and the oil extraction machine. In another embodiment of the present invention, the filter conveyor may take the form of a belt conveyor that feeds the multi-layered modified carbon fiber absorbent to the oil extraction machine, where the filter conveyor comprises a conveyor inlet and a conveyor outlet. The multi-layered modified carbon fiber absorbent is fed into the conveyor inlet, where the multi-layered modified carbon fiber absorbent is directed and passed into the oil extraction machine. The multi-layered modified carbon fiber absorbent is then dispensed out of the oil extraction machine through the conveyor outlet. In another embodiment, the multi-layered modified carbon fiber absorbent may take the form of a belt, cycling through the conveyor inlet, the oil extraction machine, and the conveyor outlet, where the multi-layered modified carbon fiber absorbent continuously passes through the oil-contaminated area to continuously extract the quantity oil out of the oil-contaminated area.

In reference to FIG. 1, the quantity of oil from the multi-layered modified carbon fiber absorbent is extracted through the oil extraction machine. In the preferred embodiment of the present invention, the oil extraction machine may take the form of at least one motorized cylindrical roller extractor that passes and presses the multi-layered modified carbon fiber absorbent through the at least one motorized cylindrical roller extractor, where the quantity of oil is extracted and separated from the multi-layered modified carbon fiber absorbent. In the preferred embodiment of the present invention, the at least one motorized cylindrical roller extractor may take the form of a set of solid motorized imperforate roller cylinders that are positioned adjacent to each other. The set of solid motorized imperforate roller cylinders will rotate on the same rotational axis, feeding the multi-layered modified carbon fiber absorbent between the solid motorized imperforate roller cylinders to press and extract any absorbed quantity of oil seeped within the multi-layered modified carbon fiber absorbent. In the preferred embodiment of the present invention, the pressed multilayered modified carbon fiber absorbent is heated using the heating element.

In reference to FIGS. 1 and 8, the extracted quantity of oil is collected into the first storage vessel. In the preferred embodiment of the present invention, the extracted quantity of oil is separated from the multi-layered modified carbon fiber absorbent, where the extracted quantity of oil seeps down to the first storage vessel. In the preferred embodiment of the present invention, the first storage vessel may take the form of a collection vat that funnels and collects the extracted quantity of oil. More specifically, the first storage vessel may take the form of an oil impermeable fiberglass storage ball coated with a layer of resistance polymer. In the preferred embodiment of the present invention, the fiberglass storage ball is coated with a layer of polypropylene but may coated with any other suitable resistance polymer.

Figure 2:
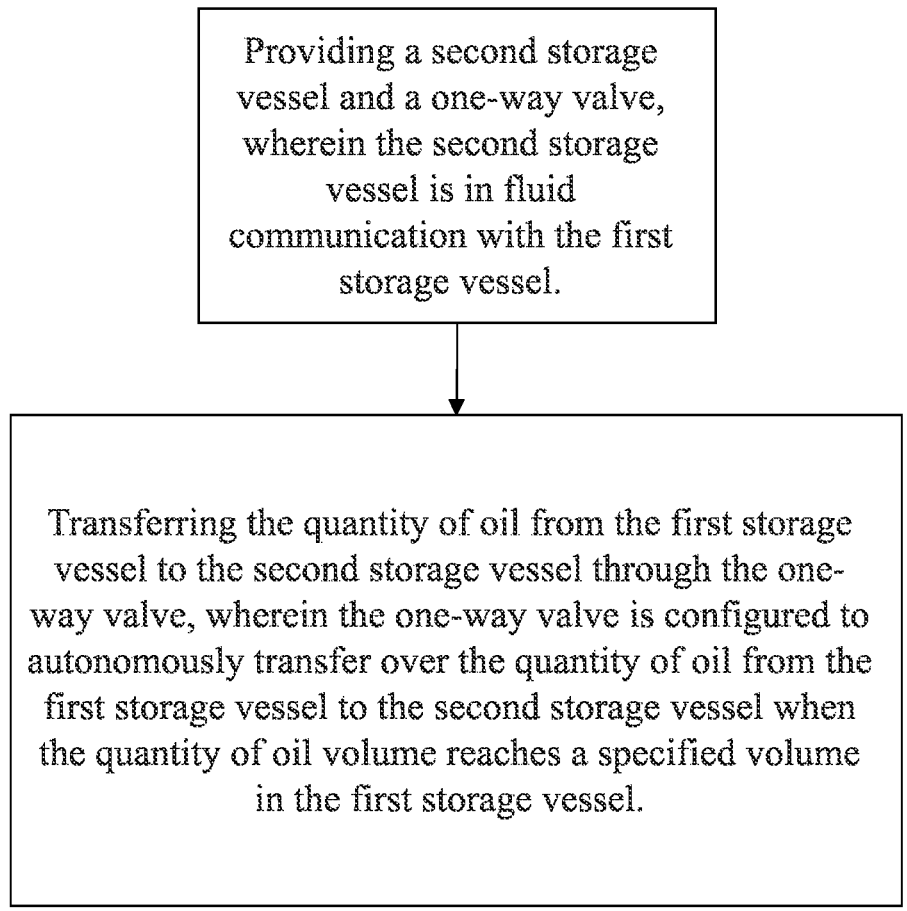
FIG. 2 is a flowchart illustrating the process of transferring a quantity of oil from a first storage vessel to a second storage vessel.

In the preferred embodiment of the present invention, a second storage vessel and a one-way valve is provided, where the second storage vessel is in fluid communication with the first storage vessel, as shown in FIGS. 2 and 8. The quantity of oil from the first storage vessel is transferred to the second storage vessel through the one-way valve, wherein the one-way valve is configured to autonomously transfer over the quantity of oil from the first storage vessel to the second storage vessel when the quantity of oil volume reaches a specified volume in the first storage vessel. In the preferred embodiment of the present invention, the one-way valve autonomously transfers over the quantity of oil from the first storage vessel to the second storage vessel using a volumetric sensor, where the volumetric sensor is in electronically connected to the one-way valve, and where the volumetric sensor is configured to open the one-way valve to an open position when a maximum specified volume is reached. The volumetric sensor is also configured to close the one-way valve when a minimum specified volume is reached. In the preferred embodiment of the present invention, the second storage vessel is a storage ship suited to contain the quantity of oil volume transported from the first storage vessel to the second storage vessel. This way, the second storage vessel is transportable, allowing the second storage vessel to move the quantity of oil volume to in-shore oil storage containers that can then later be processed further. In another embodiment, the second storage vessel may take the form of an in-shore oil storage container, where the first storage vessel is in fluid communication with the in-shore oil storage container through an oil transport pipeline.

Figure 7:
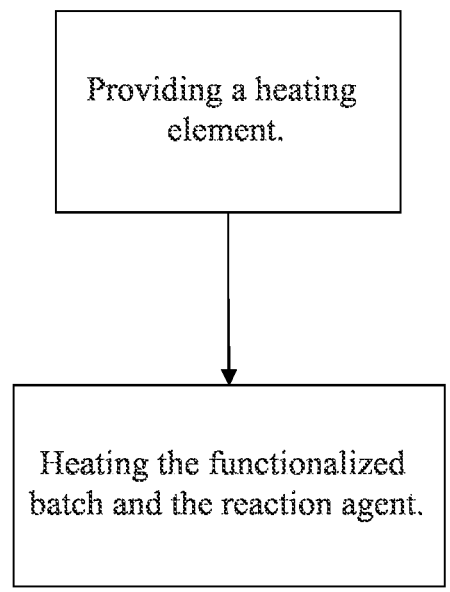
FIG. 7 is a flowchart illustrating the process of heating a functionalized batch and a reaction agent.

In the preferred embodiment of the present invention, a manufacturing process of the multi-layered carbon fiber absorbent is presented, as shown in FIGS. 3-7 and 10-11. In order to execute the overall process for the method of manufacture of the multi-layered carbon fiber absorbent, the method of manufacture requires a quantity of carbon fibers, a production vessel, a reaction vessel, a condenser, an agitation element, a drying element, a functionalizing agent, a reaction agent, a first rinsing agent, a second rinsing agent, a heating element, and an agitation element. The quantity carbon fibers is added in the production vessel with the quantity of functionalizing agent to form a production batch. In the preferred embodiment of the present invention a heating element and an agitation element is provided, as shown in FIG. 7. The production batch is agitated with the agitation element. The production batch is heated with the heating element. In the preferred embodiment of the present invention, the functionalizing agent includes a quantity of acetic acid, and a quantity of hydrochloric acid.

Figure 3:
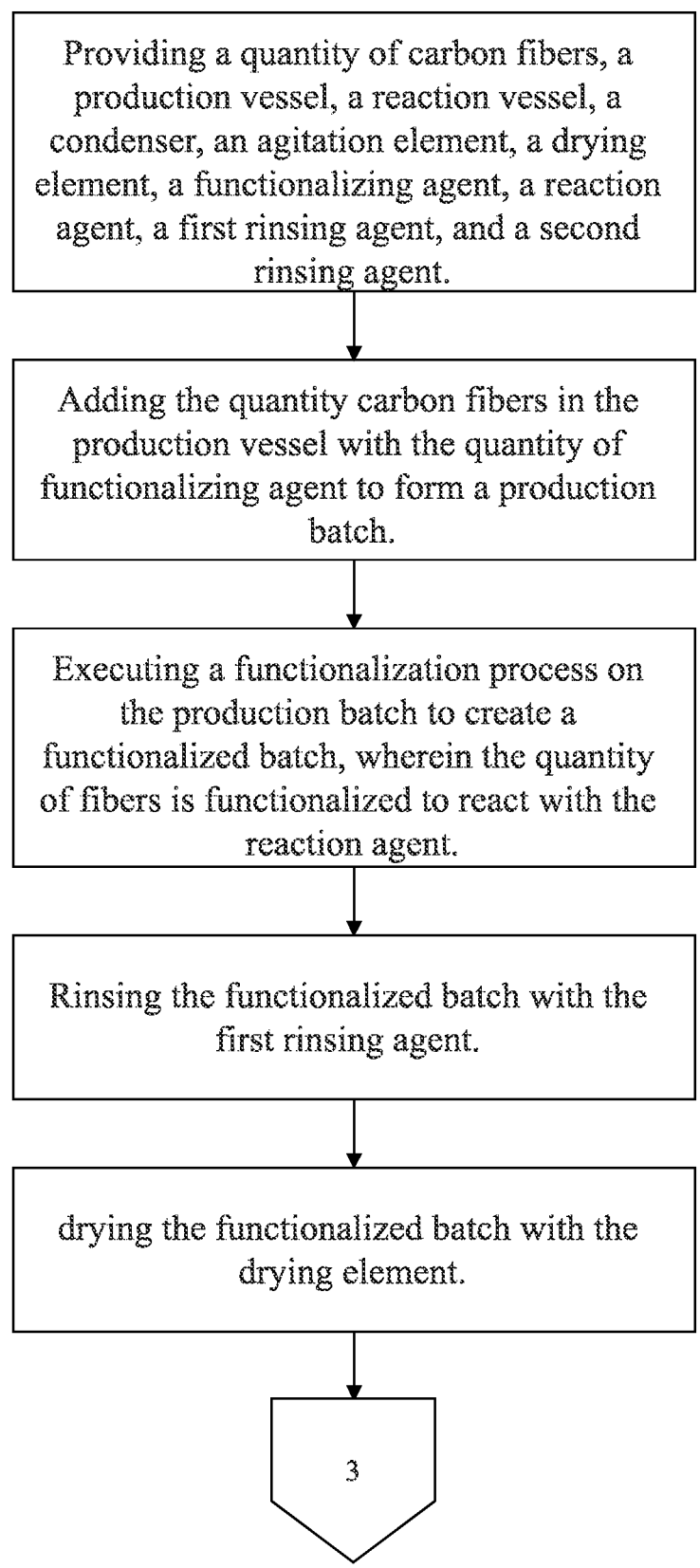
FIG. 3 is a flowchart illustrating the overall process of manufacturing modified carbon fibers.

In reference to FIG. 3, a functionalization process is then executed on the production batch to create a functionalized batch, where the quantity of fibers is functionalized to react with the reaction agent. In the preferred embodiment of the present invention, the reaction agent includes a quantity of octadecyltrichlorosilane. In another embodiment, the reaction agent includes a quantity of toluene and a quantity of octadecyltrichlorosilane. The functionalized batch and the reaction agent are heated using the heating element, as shown in FIG. 7. The functionalized batch is then rinsed with the first rinsing agent. In the preferred embodiment of the present invention, the first rinsing agent includes a quantity of deionized water and a quantity of methanol. The functionalized batch is then dried with the drying element. The functionalized batch and the reaction agent are then placed in the reaction vessel with the condenser attached to form a reaction batch.

Figure 4:
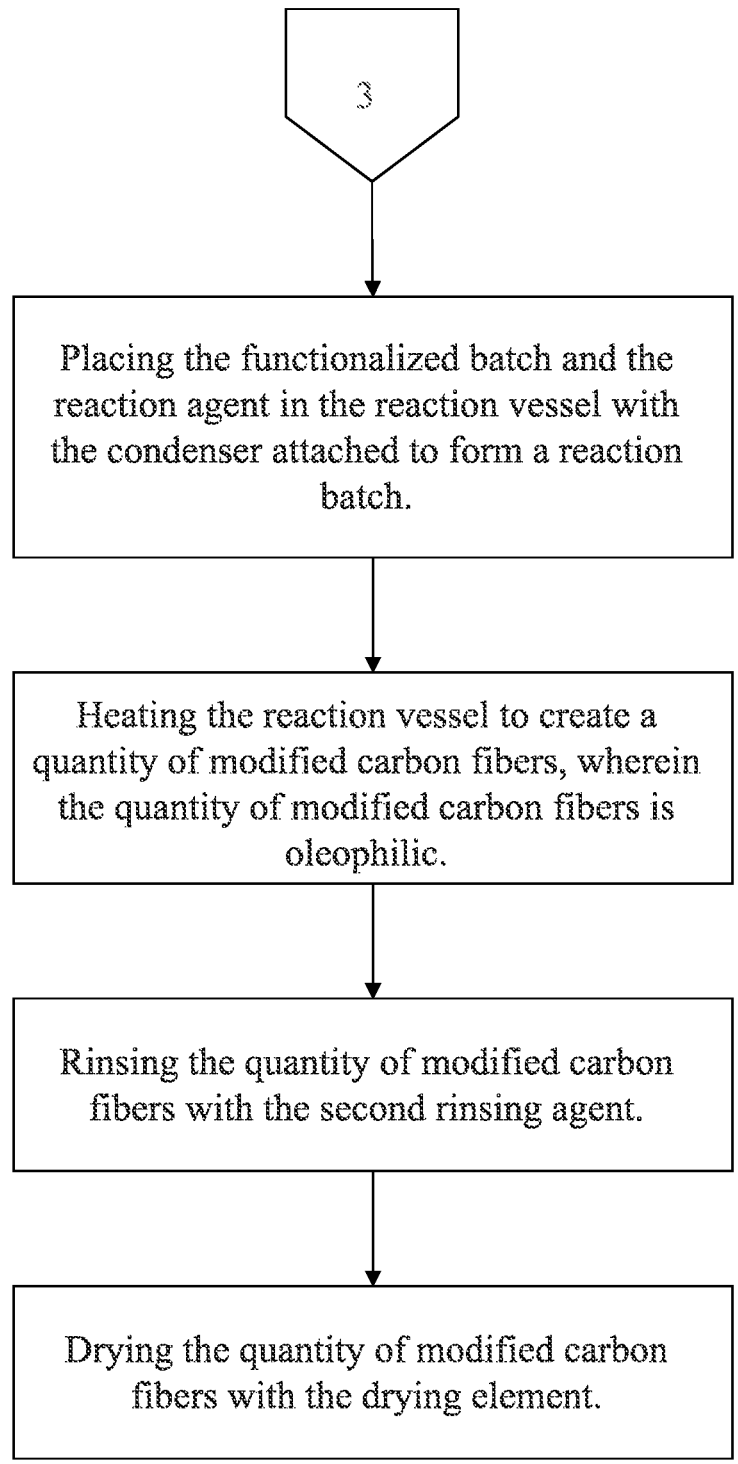
FIG. 4 is a continuing flowchart illustrating the overall process of manufacturing modified carbon fibers absorbent from FIG. 3.
Figure 5:
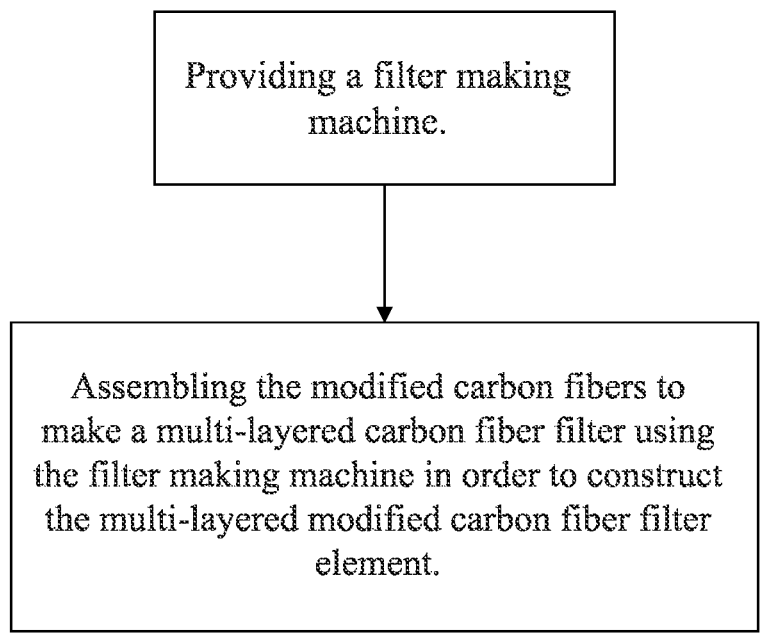
FIG. 5 is a flowchart illustrating the process of assembling the modified carbon fibers to make a multi-layered carbon fiber absorbent.
Figure 6:
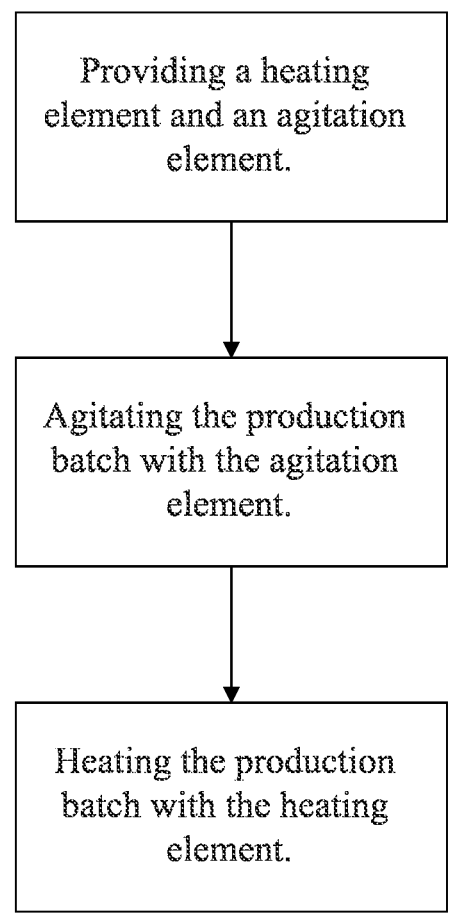
FIG. 6 is a flowchart illustrating the process of heating and agitating a production batch.

In reference to FIG. 4, the reaction vessel is then heated to create a quantity of modified carbon fibers, where the quantity of modified carbon fibers is oleophilic and hydrophobic. Finally, the quantity of modified carbon fibers is then rinsed with the second rinsing agent. In the preferred embodiment of the present invention, the second rinsing agent includes a quantity of toluene and a quantity of methanol. The quantity of modified carbon fibers is then dried with the drying element. Furthermore, the quantity of modified carbon fibers is then further processed into the multi-layered modified carbon fiber absorbent. A filter making machine is provided, as shown in FIG. 5. The quantity of modified carbon fibers is assembled to make a multi-layered carbon fiber absorbent using the filter making machine. In the preferred embodiment of the present invention, the filter making machine may take the form of any suitable filter making machine suitable in producing multi-layered modified carbon fiber absorbent filters out of modified carbon fibers. In one embodiment, the filter making machine may employ a fiber compression press that produces sheets of compressed fibers. These sheets are then bonded or weaved together to form a multi-layered modified carbon fiber absorbent filter.

Although the invention has been explained in relation to its preferred embodiment, it is to be understood that many other possible modifications and variations can be made without departing from the spirit and scope of the invention as hereinafter claimed.

What is claimed is:

1. A method of cleaning up oil spills using a multi-layered modified carbon fiber absorbent, the method comprises the steps of:
   providing an oil-contaminated area comprising a quantity of oil, a first storage vessel, an oil extraction machine, and a multi-layered modified carbon fiber absorbent;
   wherein the multi-layered modified carbon fiber absorbent is manufactured by the method comprising the steps of: providing a quantity of carbon fibers, a production vessel, a reaction vessel, a condenser, an agitation element, a drying element, a functionalizing agent, a reaction agent, a first rinsing agent, and a second rinsing agent, adding the quantity carbon fibers in the production vessel with the quantity of functionalizing agent to form a production batch; executing a functionalization process on the production batch to create a functionalized batch, wherein the quantity of fibers is functionalized to react with the reaction agent; rinsing the functionalized batch with the first rinsing agent; drying the functionalized batch with the drying element; placing the functionalized batch and the reaction agent in the reaction vessel with the condenser attached to form a reaction batch; heating the reaction vessel to create a quantity of modified carbon fibers, wherein the quantity of modified carbon fibers is oleophilic; rinsing the quantity of modified carbon fibers with the second rinsing agent; and drying the quantity of modified carbon fibers with the drying element;
   distributing the multi-layered modified carbon fiber absorbent to the oil-contaminated area, wherein the multi-layered modified carbon fiber absorbent is configured to extract the quantity of oil from the oil-contaminated area while maintaining hydrophobic;
   extracting the quantity of oil from the multi-layered modified carbon fiber absorbent through the oil extraction machine; and
   collecting the extracted quantity of oil into the first storage vessel.

2. The method of cleaning up oil spills using a multi-layered modified carbon fiber absorbent of claim 1, the method further comprising the steps of:
   providing a second storage vessel and a one-way valve, wherein the second storage vessel is in fluid communication with the first storage vessel; and
   transferring the quantity of oil from the first storage vessel to the second storage vessel through the one-way valve, wherein the one-way valve is configured to autonomously transfer over the quantity of oil from the first storage vessel to the second storage vessel when the quantity of oil volume reaches a specified volume in the first storage vessel.

3. The method of cleaning up oil spills using a multi-layered modified carbon fiber absorbent of claim 1, the method further comprising the steps of:
   wherein the oil extraction machine includes at least one motorized cylindrical roller extractor.

4. The method of cleaning up oil spills using a multi-layered modified carbon fiber absorbent of claim 1, the method further comprising the steps of:
   wherein the first storage vessel is a fiberglass storage ball coated with a layer of resistance polymer.

5. The method of cleaning up oil spills using a multi-layered modified carbon fiber absorbent of claim 1, the method further comprising the steps of:
   wherein the second storage vessel is a storage ship.

6. The method of cleaning up oil spills using a multi-layered modified carbon fiber absorbent of claim 1, the method further comprising the steps of:
   providing a filter making machine; and
   assembling the modified carbon fibers to make a multi-layered modified carbon fiber filter using the filter making machine in order to construct the multi-layered modified carbon fiber filter element.

7. The method of cleaning up oil spills using a multi-layered modified carbon fiber absorbent of claim 1, the method further comprising the steps of:
   providing a heating element and an agitation element;
   agitating the production batch with the agitation element; and
   heating the production batch with the heating element.

8. The method of cleaning up oil spills using a multi-layered modified carbon fiber absorbent of claim 1, the method further comprising the steps of:
   providing a heating element; and
   heating the functionalized batch and the reaction agent.

9. The method of cleaning up oil spills using a multi-layered modified carbon fiber absorbent of claim 1, the method further comprising the steps of:
   wherein functionalizing agent includes a quantity of acetic acid, and a quantity of hydrochloric acid.

10. The method of cleaning up oil spills using a multi-layered modified carbon fiber absorbent of claim 1, the method further comprising the steps of:
   wherein the first rinsing agent includes a quantity of deionized water and a quantity of methanol.

11. The method of cleaning up oil spills using a multi-layered modified carbon fiber absorbent of claim 1, the method further comprising the steps of:
   wherein the reaction agent includes a quantity of octadecyltrichlorosilane.

12. The method of cleaning up oil spills using a multi-layered modified carbon fiber absorbent of claim 1, the method further comprising the steps of:
   wherein the reaction agent includes a quantity of toluene and a quantity of octadecyltrichlorosilane.

13. The method of cleaning up oil spills using a multi-layered modified carbon fiber absorbent of claim 1, the method further comprising the steps of:
   wherein the second rinsing agent includes a quantity of toluene and a quantity of methanol.

\* \* \* \* \*